March 27, 1928. 1,663,590

G. GOURDON

ELECTRICALLY CONTROLLED MEASURING DEVICE

Filed Sept. 21, 1925 3 Sheets-Sheet 1

Inventor:
Georges Gourdon
By
Attorney

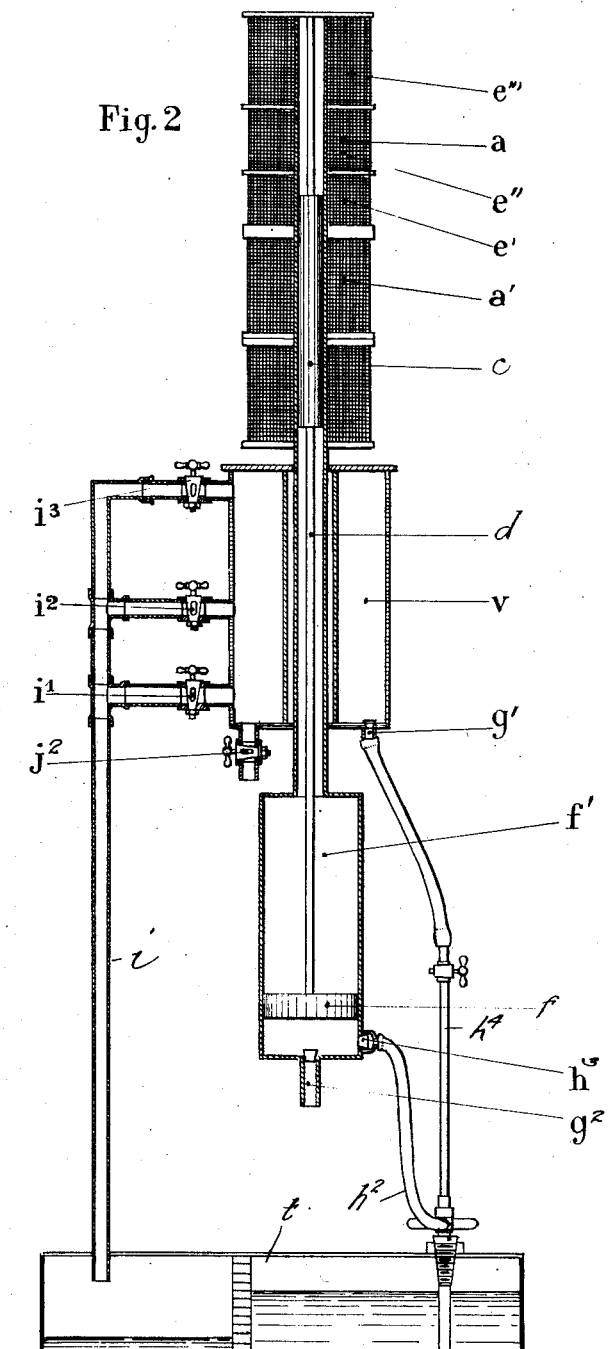

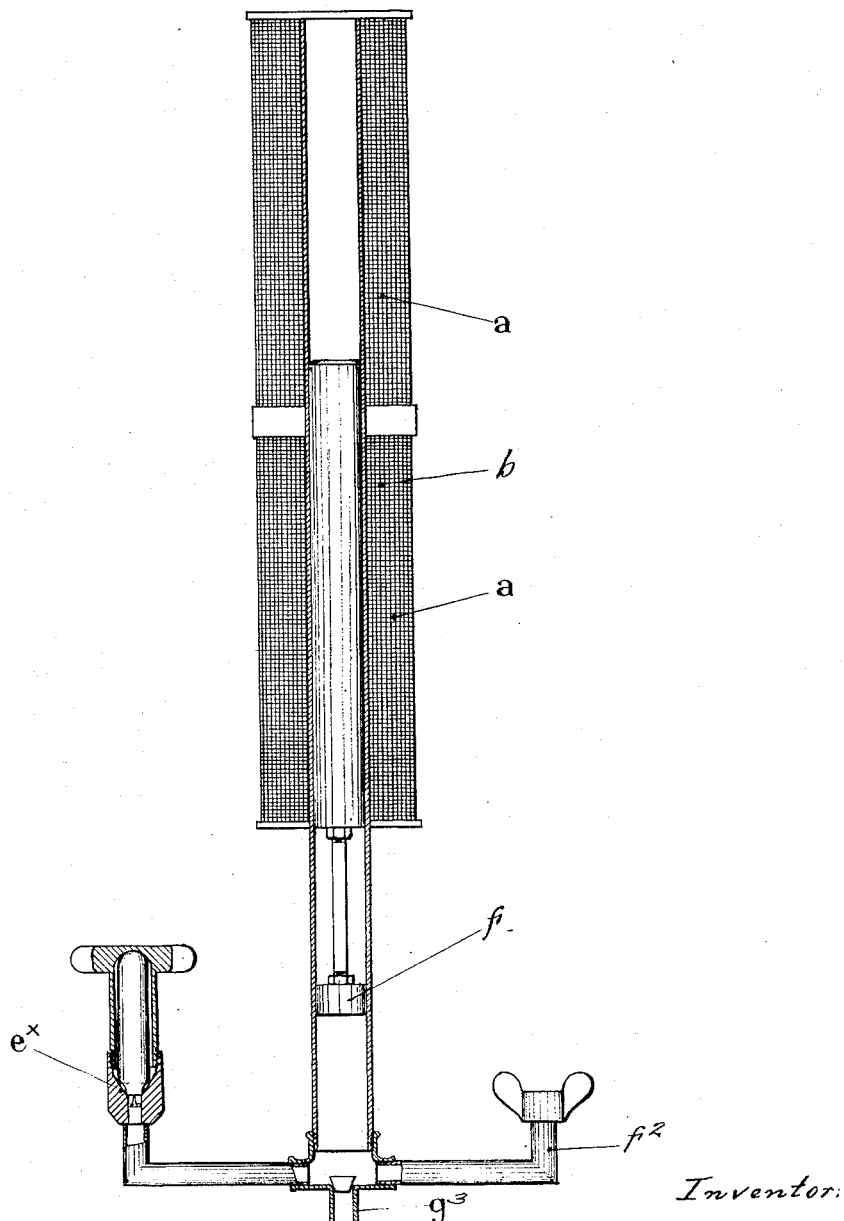

Patented Mar. 27, 1928.

1,663,590

UNITED STATES PATENT OFFICE.

GEORGES GOURDON, OF MALAKOFF, FRANCE.

ELECTRICALLY-CONTROLLED MEASURING DEVICE.

Application filed September 21, 1925, Serial No. 57,714, and in France September 23, 1924.

This invention relates to apparatus for dispensing liquid in predetermined quantities, and it comprehends an improved apparatus of the character indicated in which an electromagnetic controller is utilized for effecting the required regulation of the amounts discharged. The improvements in question involve the employment of a piston operatively related to the electromagnetic controller, and the provision of a device for selectively energizing the coils of the magnets to impart strokes of different definite extents to such piston.

Various embodiments are illustrated in the accompanying drawings, in which:

Fig. 2 is a view of similar character, in which the liquid to be dispensed is forced by air pressure into a dispensing vessel to be discharged therefrom;

Fig. 3 represents a modification of Fig. 1, in which a carbonating attachment is provided.

Figure 1:
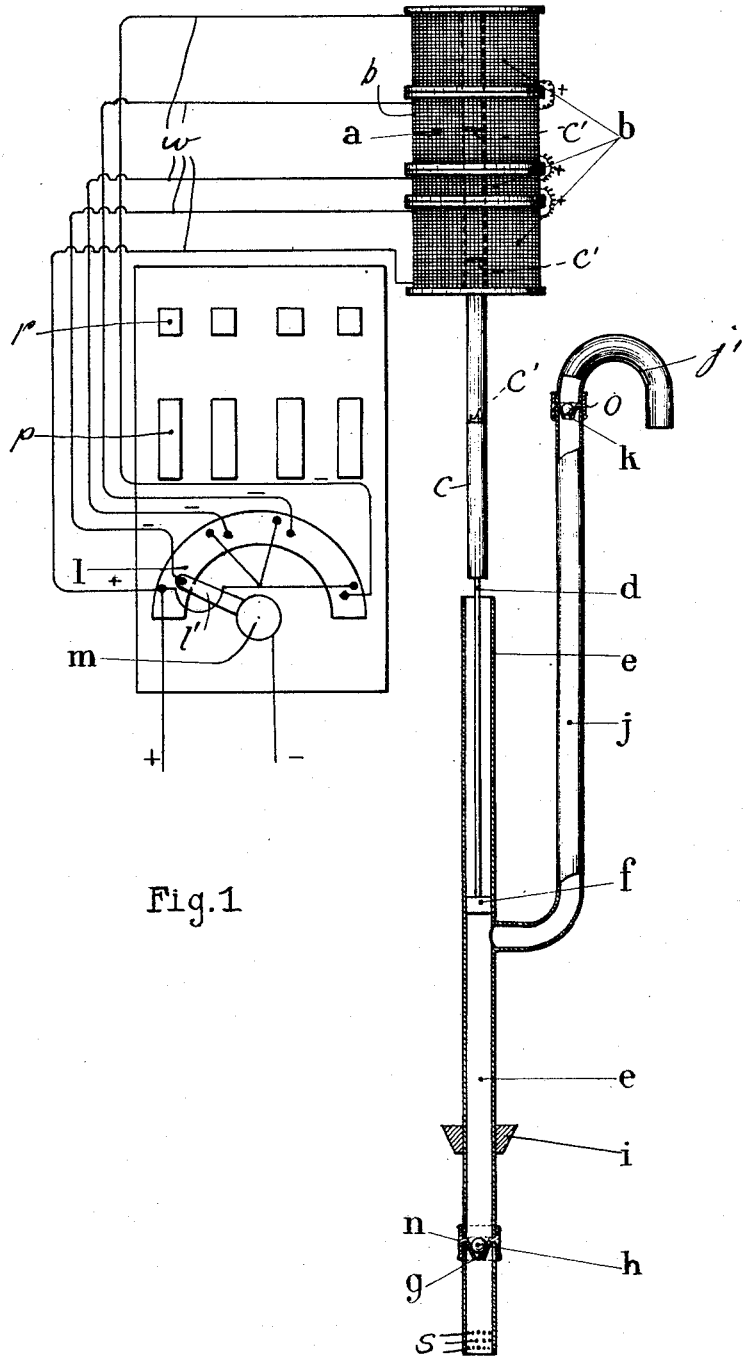
Figure 1 is a front view, partly diagrammatic and with parts in section, in which a single-acting pump is utilized in connection with the controller.

Referring more particularly to Fig. 1, the controller therein represented comprises a magnet $a$ embodying a plurality of distinct coils $b$, in this instance four, which are separately connected by wires $w$ to the contact sector $l$ of a selective switch, the circuit of which is closed by a push-button $m$ that is carried by, or otherwise connected with, the switch arm or pointer $l'$. The precise details of the switch form no part of the invention and, hence, require no description; it being apparent that pointer or arm $l'$ can be set to engage the proper contact on the sector, and the button $m$ then depressed, whereupon a circuit will be closed through the corresponding solenoid or magnet coil and will be broken so soon as the pressure on the button is relieved.

In practice, a counter is associated with the selecting switch, and comprises a set of magnets $p$, one for each contact of the sector $l$ (in other words, one for each coil); and these magnets are designed to actuate counting wheels which are visible through windows $r$ in the casing of the counter, the arrangement being such that a magnet is operated each time a circuit is closed through button $m$, so that by taking the total of operations indicated by the wheel at each window, the total quantity of liquid dispensed can be determined and the cost thereof checked with the receipts. This mechanism, however, is merely an adjunct to the dispensing apparatus or mechanism and is not involved in the invention, so that further description and illustration are deemed unnecessary.

Reverting to the controller proper, it will be seen that its four component solenoids or coils $b$ have a single core $c$ common to them all, which core has connected to it a rod $d$ that extends downward through a tube $e$ that is constructed of glass reinforced in some suitable way; said rod terminating at its lower end in a piston $f$. The tube $e$ is perforated at its foot as at $s$ to provide inlets for the liquid to be dispensed, and is equipped with an internal valve seat $g$, containing a glass ball valve $h$, at a short distance above such inlets. The portion of the tube in which the valve seat is fitted is made detachable for cleaning purposes, and is secured to the tube proper by a collar or coupling $n$.

As will be apparent, the core $c$ and the rod $d$ and piston $f$ connected thereto will tend to assume a lowered position, due to their weight, normally or when the current is shut off from the controller. When one of the solenoid coils is energized, however, the core will be attracted or drawn upward; and the extent of such movement will be dependent upon the particular coil selected, but in any case will be definite—that is to say, there will be a movement of definite distance when the bottom coil is energized, and a movement of equally definite, though different, distance when the second coil is energized, and so on. Consequently, if the end of the tube be inserted through the bung hole of a cask or the like, and held in place by a suitable rubber bung $i$, and a circuit is closed through one of the solenoid coils, the attraction of the core $b$ and the attendant upward movement of the piston $f$ will cause the latter to draw into the tube from the cask a quantity of liquid which depends on the length of such movement.

The discharge of the liquid thus sucked into the tube takes place upon the downstroke of the piston which, as explained above, is effected by gravity when the circuit is broken. It will be understood that the piston $f$ has a normal position in the tube which is its downward limit of movement; and slightly below this position a branch pipe $j$ leads upwardly from said tube and terminates in an inverted goose-neck section $j'$ which is detachably connected to it by a collar or coupling $o$ equipped with a non-return valve $k$ similar to the valve $g$, $h$, previously mentioned. The downward gravital movement of the core and piston will therefore force the liquid out through pipe $j$, $j'$, so that the apparatus as a whole will thus operate in the manner of a single-acting suction and force pump, the barrel of which is constituted by the glass tube $e$. This pump, moreover, possesses the advantage that it is air-free in its piping, since the non-return valve $k$ prevents the entrance of air as soon as the pumping operation ceases.

If desired, a more accurate regulation of the movement of the core and, hence, of the suction stroke of the pump piston can be obtained by constructing the core in sections which have a fine threaded connection with each other to permit a micrometric endwise adjustment. This connection is indicated in a somewhat diagrammatic manner at $c'$.

In the apparatus shown in Fig. 2, the piston $f$, instead of forming part of a combined suction and force pump, constitutes part of an air compressor, the cylinder of which is designated $f'$ and is provided at its bottom with a valve-controlled air inlet $g^2$. The rod $d$ of the piston is connected, as in the previous form, to the core $c$ of the electromagnetic controller which, in this instance, is double acting and comprises two superposed magnets $a$ and $a'$; the upper magnet $a$ consisting of three coils $e'$, $e''$, $e'''$ and effecting the suction strokes of the piston, while the lower magnet $a'$ effects the retraction of the core and, consequently, the compression strokes of the piston. Selective switch connections, similar to those of Fig. 1, or of any other desired character, may be provided for energizing the magnets and their coils but are omitted in order to avoid unnecessary repetition of parts.

A flexible tube or pipe $h^2$ leads from cylinder $f'$ into an air-tight compartment of a tank $t$, said tube having a non-return valve $h^3$ at its inlet end. The compressed air thus supplied to the tank acts on the surface of the liquid therein and forces the liquid upward through a delivery pipe $h^4$ into the bottom of a graduated glass dispensing vessel $v$, a non-return valve $g'$ being provided at the outlet end of the pipe. Regulation of the quantity of air delivered to the tank and, therefore, the quantity of liquid delivered from the latter to the dispensing vessel, thus depends upon the particular solenoid coil which has been energized.

The aforementioned vessel $v$ may be graduated in any desired manner: in the present instance, for example, for three definite quantities, say 5, 10 and 20 liters. A valved branch overflow pipe is therefore provided for each of these quantities, indicated more or less generally at $i'$, $i^2$ and $i^3$, these pipes opening into a common return pipe $i$ which leads back to the tank; and in addition a valved outlet $j^2$ is also provided at the bottom of the vessel $v$. The compartment into which the return pipe discharges is likewise air-tight, and may be used when full and when the first compartment is empty, by merely transferring the piping $h^2$, $h^4$ from one compartment to the other.

In operation, the controller is operated to force into the delivery compartment of the tank $t$, by energizing the proper coils, a quantity of air corresponding to an amount of liquid slightly in excess of the amount to be dispensed. The liquid is discharged from the tank, by way of pipe $h^4$, into vessel $v$ and rises therein until it reaches the branch overflow pipe at the level of the corresponding graduation, the valve of which has previously been opened. The excess liquid returns to the collecting compartment of the tank, the flow ceasing as soon as the proper level is reached, and the outlet $j^2$ is then opened to draw off the liquid.

The structure illustrated in Fig. 3 is, in the main, an attachment or adjunct to be used in connection with the apparatus represented in Fig. 1, and its purpose is to supply an additional amount of carbonic acid gas to certain weak beers and other liquids. The discharge pipe $f^2$, which is provided with a valve-controlled inlet $g^3$, as before, is accordingly extended, and such extension is fitted with a device $e^x$ for holding and puncturing a metal capsule containing the compressed gas. In other respects, the operation will be the same as that described in connection with Fig. 1.

Having now described my invention what I claim is:—

1. In a liquid-dispensing apparatus, a tubular element; a piston movable therein; and an electromagnetic controller embodying a plurality of independent solenoid coils, a core common to all the coils and connected to the stem of the piston to enable movement of the two as a unit, and means for selectively energizing the solenoid coils to vary the length of stroke of the core and its connected piston.

2. In a liquid-dispensing apparatus, a tubular element; a piston movable therein; and an electromagnetic controller embodying a plurality of independent solenoid coils, and a core common to all the coils and connected to the stem of the piston to enable movement of the two as a unit, any selected coil being individually energizable to the exclusion of other coils so as to vary the length of the stroke of the core and its connected piston.

3. In a liquid-dispensing apparatus embodying an electromagnetic controller according to claim 2, a core for the several solenoid coils comprising a plurality of members adjustably related to each other to vary the length of the core and thereby its position with relation to the coils independently of the selective energization of said coils.

4. In a dispensing apparatus, a piston; a hollow element wherein the piston is movably arranged having a valve-controlled fluid inlet and a valve-controlled fluid outlet located one below the other and both below the lower limit of the down-stroke of the piston; and an electromagnetic controller embodying a plurality of independent solenoid coils, and a core common to all the coils and connected to the stem of the piston to enable movement of the two as a unit, any selected solenoid coil being individually energizable to the exclusion of other coils so as to vary the length of the up-stroke of the core and its connected piston and thereby the quantity of fluid drawn into the hollow element through its inlet during such stroke.

5. In a liquid-dispensing apparatus, a tubular element adapted to be inserted at its lower end into a container for the liquid to be dispensed and having an inlet at such end; a piston movable in said tube; a discharge pipe leading from the tube at a point above said inlet but below the lower limit of the down-stroke of the piston; and an electromagnetic controller connected with said piston for selectively imparting to the same suction strokes of different predetermined lengths so as to draw different definite quantities of liquid into the tube for expulsion therefrom during the succeeding discharge stroke of the piston.

6. In a liquid-dispensing apparatus, a tubular element adapted to be inserted at its lower end into a container for the liquid to be dispensed and having an inlet at such end; a piston movable in said tube; a discharge pipe leading from the tube at a point above said inlet but below the lower limit of the down-stroke of the piston; an electromagnetic controller connected with said piston for causing it to make its suction stroke; and means for selectively energizing said controller to vary the extent of such stroke according to different definite limits and thereby regulate the amounts of liquid drawn into the tube, said piston making its discharge stroke gravitally consequent upon the deenergization of the controller to expel the liquid from the tube.

7. A liquid-dispensing apparatus, comprising a pump embodying a barrel adapted for insertion at its inlet end into a container for the liquid to be dispensed, said barrel also having an outlet, and a piston working in the barrel; and an electromagnetic device connected to said piston for selectively causing the latter to make suction strokes of different definite lengths so as to draw into the barrel different definite amounts of liquid for expulsion therefrom during the succeeding discharge stroke of the piston.

In testimony whereof I have affixed my signature.

GEORGES GOURDON.